(12) United States Patent
Fischmann

(10) Patent No.: US 10,724,260 B2
(45) Date of Patent: Jul. 28, 2020

(54) CONSTRUCTION METHOD FOR CREATING A RESTRICTED ACCESS SWIMMING LAGOON WITH BEACHES AT A RETAIL SITE

(71) Applicant: CRYSTAL LAGOONS TECHNOLOGIES, Inc., Wilmington, DE (US)

(72) Inventor: Fernando Benjamin Fischmann, Santiago (CL)

(73) Assignee: CRYSTAL LAGOONS TECHNOLOGIES, Inc., Wilmington, DE (US)

( * ) Notice: Subject to any disclaimer, the term of this patent is extended or adjusted under 35 U.S.C. 154(b) by 0 days.

(21) Appl. No.: 16/538,273

(22) Filed: Aug. 12, 2019

(65) Prior Publication Data
US 2020/0208426 A1    Jul. 2, 2020

Related U.S. Application Data

(60) Provisional application No. 62/785,086, filed on Dec. 26, 2018.

(51) Int. Cl.
*E04H 4/00* (2006.01)
*E04H 3/02* (2006.01)
(Continued)

(52) U.S. Cl.
CPC .............. *E04H 4/00* (2013.01); *E02D 17/00* (2013.01); *E04H 3/02* (2013.01); *E04H 3/12* (2013.01); *E04H 4/144* (2013.01); *E04H 4/148* (2013.01); *E04H 17/00* (2013.01); *E04H 2004/146* (2013.01); *G06Q 50/08* (2013.01); *G06Q 50/165* (2013.01)

(58) Field of Classification Search
CPC .. E04H 4/144; E04H 4/00; E04H 3/02; E04H 17/00; E04H 2004/146; E04H 4/148; E04H 3/12; G06Q 50/165; G06Q 50/08; E02D 17/00
USPC ......... 52/169.1, 169.7, 169.8, 741.11, 742.1, 52/742.14
See application file for complete search history.

(56) References Cited

U.S. PATENT DOCUMENTS 483,600 A    10/1892  Butler
1,657,598 A    1/1928  Whitman
(Continued)

FOREIGN PATENT DOCUMENTS

EP    1 561 495 A1    8/2005
WO    2006/116745 A2    11/2006

OTHER PUBLICATIONS

Beaches Negril, Beaches Resorts by Sandals <https://www.beaches.com/resorts/negril/maps/> (Year: 2020).*
(Continued)

*Primary Examiner* — Brent W Herring
(74) *Attorney, Agent, or Firm* — Merchant & Gould P.C.

(57) ABSTRACT

The present invention discloses a construction method for demolishing a portion of a retail site, including a shopping mall with an anchor big-box store, or a standalone big-box store and/or their associated parking space, in order to create a restricted access swimming lagoon with a beach at a retail site, in order to provide a completely new setting within the retail site that aims to attract clients based on new consumer trends.

21 Claims, 12 Drawing Sheets

(51) Int. Cl.
*E02D 17/00* (2006.01)
*G06Q 50/08* (2012.01)
*E04H 4/14* (2006.01)
*E04H 3/12* (2006.01)
*E04H 17/00* (2006.01)
*G06Q 50/16* (2012.01)

(56) References Cited

U.S. PATENT DOCUMENTS

| | | | | |
|---|---|---|---|---|
| 3,673,751 A * | 7/1972 | Boassy | | E04H 4/0012 |
| | | | | 52/169.7 |
| 3,739,539 A * | 6/1973 | Posnick | | E04H 4/0043 |
| | | | | 52/169.8 |
| 3,823,690 A * | 7/1974 | Rynberk | | E04H 4/00 |
| | | | | 52/169.7 |
| 3,832,814 A * | 9/1974 | Teschner | | E04H 4/0081 |
| | | | | 52/169.7 |
| 3,990,250 A | 11/1976 | Howard | | |
| 4,263,759 A * | 4/1981 | Miller | | E04H 4/00 |
| | | | | 264/31 |
| 4,686,799 A | 8/1987 | Kwake | | |
| 4,843,658 A * | 7/1989 | Hodak | | E04H 4/0081 |
| | | | | 4/506 |
| 4,976,088 A * | 12/1990 | Powers | | E04H 4/0081 |
| | | | | 52/169.7 |
| 5,139,853 A | 8/1992 | Mathieson et al. | | |
| 5,800,272 A | 9/1998 | Pons | | |
| 6,317,901 B1 | 11/2001 | Corpuel | | |
| 6,764,139 B1 * | 7/2004 | Wortman | | E01C 23/121 |
| | | | | 172/817 |
| 7,036,449 B2 | 5/2006 | Sutter | | |
| 7,717,569 B2 | 5/2010 | Sokeila et al. | | |
| 8,544,220 B2 * | 10/2013 | Milani | | E02B 3/16 |
| | | | | 52/169.7 |
| 10,072,430 B2 | 9/2018 | Nasibov | | |
| 10,358,837 B2 * | 7/2019 | Khamis | | E04H 4/144 |
| 10,428,542 B1 * | 10/2019 | Jackson | | E04H 4/0081 |
| 10,472,839 B2 * | 11/2019 | Khamis | | E04H 4/14 |
| 10,521,870 B2 * | 12/2019 | Fischmann | | E04H 4/0006 |
| 2001/0018370 A1 | 8/2001 | Arie | | |
| 2007/0248414 A1 * | 10/2007 | Fratianni | | E04H 4/00 |
| | | | | 405/53 |
| 2008/0021776 A1 | 1/2008 | Lochtefeld | | |
| 2008/0116142 A1 | 5/2008 | Fischmann Torres | | |
| 2011/0108490 A1 | 5/2011 | Fischmann Torres | | |
| 2012/0024796 A1 | 2/2012 | Fischmann | | |
| 2012/0061967 A1 | 3/2012 | Chaganti et al. | | |
| 2014/0228138 A1 | 8/2014 | Scott | | |
| 2015/0125212 A1 * | 5/2015 | Fischmann | | B01D 21/0012 |
| | | | | 405/63 |
| 2015/0166361 A1 | 6/2015 | Fischmann | | |
| 2016/0177586 A1 | 6/2016 | Nasibov | | |
| 2019/0169867 A1 * | 6/2019 | Khamis | | E04H 4/14 |
| 2019/0169870 A1 * | 6/2019 | Khamis | | E04H 4/0093 |
| 2019/0232180 A1 | 8/2019 | Fischmann | | |
| 2019/0236744 A1 * | 8/2019 | Fischmann | | C02F 1/004 |
| 2019/0355083 A1 * | 11/2019 | Fischmann | | E04B 1/342 |
| 2020/0023281 A1 * | 1/2020 | Fischmann | | C02F 1/56 |
| 2020/0023282 A1 | 1/2020 | Fischmann | | |
| 2020/0027186 A1 * | 1/2020 | Fischmann | | E04B 1/342 |
| 2020/0032502 A1 * | 1/2020 | Fischmann | | E04H 3/02 |
| 2020/0032503 A1 * | 1/2020 | Fischmann | | C02F 1/004 |
| 2020/0051057 A1 * | 2/2020 | Fischmann | | E04H 4/148 |
| 2020/0074577 A1 * | 3/2020 | Fischmann | | E04H 4/0006 |
| 2020/0074579 A1 | 3/2020 | Fischmann | | |

OTHER PUBLICATIONS

International Search Report and Written Opinion for Application No. PCT/US19/68410 dated Mar. 24, 2020.
Daytona International Speedway, Wikipedia, https://web.archive.org/web/20180912065408/https://en.wikipedia.org/wiki/Daytona_International_Speedway, 14 pages (Sep. 9, 2018).
Six Flags Great America, Wikipedia, https://en.wikipedia.org/wiki/Six_Flags_Great_America, 26 pages (Feb. 18, 2020).
Six Flags Great America, https://www.sixflags.com/greatamerica/attractions/water-park-rides, 1 page (Dec. 16, 2018).
International Search Report and Written Opinion for Application No. PCT/US19/68414 dated Apr. 1, 2020.
"Public Access Lagoons" (Crystal Lagoons) retrieved from https://web.archive.org/web/20180727155828/https://www.crystal-lagoons.com/public-access-lagoons/>, 1 page (Jul. 27, 2018).
International Search Report and Written Opinion for Application No. PCT/US2019/06841 dated Mar. 4, 2020.
Crystal Lagoons, Crystal Lagoons at Epperson Groundbreaking with Review Masterplan, https://www.youtube.com/watch?v=U6ev1uFZ8XM, 2 pages (Jul. 25, 2017).
Jamindan, Blue Oyzer Cult Santa Cruz CA Boardwalk, https://www.youtube.com/watch?v=XScGHOPS8g0, 2 pages (Aug. 25, 2012).
International Search Report and Written Opinion for Application No. PCT/IB19/00919 dated Feb. 12, 2020.
Busbee, Jay, The wild, weird stories of Lake Lloyd at Daytona International Speedway, <https://sports.yahoo.com/blogs/nascar-from-the-marbles/the-wild--weird-stories-of-lake-lloyd-at-daytona-international-speedway-220533641.html> (Year: 2015).
Martinelli, Michelle, Why NASCAR's Daytona track has its own massive lake, <https://ftw.usatoday.com/2019/02/nascar-daytona-500-lake-lloyd-truex-bowyer> (Year: 2019).
Maps, Daytona International Speedway, <https://www.daytonainternationalspeedway.com/Plan-Your-Visit/Maps.aspx> (Year: 2020).
Geico Camping, <https://www.daytonainternationalspeedway.com/Events/2019/Circle-K-Firecracker-250/GE I CO-Camping .aspx> ( Year: 2020).
Challenge Daytona,<https://challenge-daytona.com/challengedaytona-swim/> (Year: 2020).

* cited by examiner

CONSTRUCTION METHOD FOR CREATING A RESTRICTED ACCESS SWIMMING LAGOON WITH BEACHES AT A RETAIL SITE

CROSS-REFERENCE TO RELATED CASES

This application is claims benefit of U.S. Provisional Ser. No. 62/785,086, filed 26 Dec. 2018 and which application is incorporated herein by reference. To the extent appropriate, a claim of priority is made to the above disclosed application.

FIELD OF THE INVENTION

The present invention relates generally to a construction method for creating a restricted access swimming lagoon at a retail site, for swimming and the practice of water sports, wherein a portion of a shopping mall or "big-box" store (referred to generally herein as the "retail facilities") and/or a portion of an existing parking lot adjacent to the retail facilities is demolished in order to generate a swimming lagoon. Preferably, there is an area of the swimming lagoon where public access is controlled, and a beach area is located within the controlled access area.

BACKGROUND

Currently in the world, there is an ongoing crisis in the retail market, which has mostly started in the U.S. and has grown into other countries, caused primarily by the growth in e-commerce and changes in consumer shopping tendencies.

Global trends, e-commerce, and technology have played an important role in this crisis, as it has changed the role that shopping malls play in people's lives and how consumers do not visit shopping malls exclusively for shopping anymore, but in turn are looking for innovative and entertainment experiences that go well beyond traditional shopping. Increased urbanization and aging population has increased the need for public spaces to socialize and for gatherings, where shopping malls have not moved in the same direction in the past years. This is especially true given the growing association between consumption and enjoyment, which drives the need for more engaging shopping experiences.

Due at least in part to these trends, there are currently many facilities and buildings used for commercial and retail purposes (such as shopping malls or standalone big-box stores) that are either vacant, or are suffering from economic distress such that they may become vacant in the near term.

It has been estimated that one quarter of all shopping malls in the U.S. will shutter in the next five years (according to predictions by Credit Suisse). In many cases, such spaces are no longer offering what the public is looking for, like recreational and cultural activities, a gathering place to spend time with family and friends, additional amenities, and a setting to relax and improve physical and mental health. Not only is this impacting shopping malls that often have large anchor tenant stores within their complexes, but is also significantly impacting many standalone big-box stores that do not offer additional activities or amenities.

Given these new consumer trends and the increase of e-commerce, mall operators and owners have been forced to rethink how they conceive and operate their facilities. It has been estimated that there are more than 7,000 of these types of buildings in the U.S. (including shopping malls and big-box stores), based on the inventor's research, representing a good opportunity to upgrade their use and implement new and innovative concepts that allow generating revenue of such sites and adapt to such consumer's needs. This is especially true for the U.S. market, however it will also have considerable strength in other countries around the world.

Throughout this application, retail facilities will be separated into two types for clarity: A) Shopping malls with one or more big-box stores as their anchor, along with their associated parking space, and B) standalone big-box stores with their own parking space. Big-box stores are large spaces and buildings used for the commercialization and distribution of goods, generally for one specific type of market.

Retail facilities such as a A) shopping mall with at least one big-box store and associated parking, and B) standalone big-box stores along with their parking space, are typically located within a site that will be referred to as the "retail site" throughout this application.

Generally, standalone big-box complexes sizes typically range from 5 to 20 acres in size, including the store facilities and the parking lots that surround these stores (which are generally several times the size of the store itself). Some examples of big-box stores are Toys R Us®, Sears®, Barnes and Noble®, Staples®, Walmart®, Target®, Ikea®, Costco®, Macy's®, Sam's Club®, and Lowes®, among others. As noted above, in addition to e-commerce purchasing trends, these standalone big-box stores are also suffering from changes in customer tendencies. For example, consumers are now spending more on experiences such as travel, entertainment and food. As will be next described, these types of standalone stores have suffered greatly over the last several years, causing many of them to close.

One end result of the increase of e-commerce and changes in consumer tendencies, is the closure of many shopping malls and standalone big-box stores around the world. Examples of distressed stores that have closed over the last years, and that are planning massive closures, include several of the stores listed as examples above.

Therefore, there arises a need to utilize or "re-purpose" retail sites that are facing economic distress from poor sales and/or reduced visitors, or that are closing in the near term.

Some mall owners and operators have attempted to turn their complexes into lifestyle centers, which combine traditional shopping operations (or mixed-uses) with recreational and leisure amenities oriented towards upscale consumers. For example, these lifestyle centers are configured like strip shopping centers with an open-air design where storefronts oversee landscaped park-like areas (e.g., not parking lot areas—as in conventional strip shopping centers). A typical lifestyle center may include restaurants, street furniture, greenery, movie theaters, bowling centers and other entertainment centers, open spaces, and some even offer office space, medical facilities, temporary and non-temporary lodging facilities such as hotels and motels among others, and residential facilities.

However, there are currently no massive, disruptive, and repeatable solutions that can radically change how shopping malls or standalone big-box stores are configured, and how they are optimized for consumer experience.

Further, it is important to note that these two types of retail facilities have already undergone extensive approvals and permitting for high visitor density, by having previous performed environmental impact assessments as well as road impact assessments to ensure proper suitability for a large number of visitors. Thus, although these facilities are prepared to receive a large number of visitors and have accommodations, such as dedicated roads and ample designated parking space, when no solution is found to attract the visitors, then the space and permits are lost and/or are underutilized, along with the economic potential.

SUMMARY

The present invention relates to a construction process for demolishing a portion of retail facilities that comprise an unused portion of a shopping mall or "big-box" store, together with at least a portion of an existing parking lot adjacent to the retail facilities, in order to create a swimming lagoon, where preferably, there is an area of the swimming lagoon where public access is controlled, and a beach area is located within such controlled access area.

The present invention also relates to a construction method for creating a swimming lagoon at a retail site, where optionally, the resulting swimming lagoon and adjacent spaces includes an area where access to the public is controlled—e.g., such that the number of people entering/using the area is limited by means of fences, gates, walls, etc. Further, one amenity that may be located within the controlled access area is a swimming beach area having a sloped access extending into the lagoon. Preferably, the recreational complex includes various entertainment venues such as an amphitheater, and/or other commercial and entertainment facilities.

Therefore, according to a first aspect of the invention, there is provided a construction method for creating a restricted access swimming lagoon with beaches at a retail site, for swimming and the practice of water sports, the retail site includes a shopping mall with a big-box store or a standalone big-box store, the big-box store being vacant, and an adjacent parking lot.

The land parcel on which the retail site premises are located has a property perimeter, and the vacant building has a foundation and is located within the area of the retail site, the method comprising: demolishing at least part of the retail site comprising the vacant building and/or the parking lot, wherein the demolition process includes excavating at least a 15 cm to 5 meter layer of the foundation of the vacant building and/or parking lot; excavating material having a volume of at least 4,000 m3, preferably at least 7,000 m3 from an area within the vacant building and/or the parking lot; forming a basin for a large water body having a surface area of at least 3,000 m2, preferably at least 5,000 m2 and a minimum depth of at least 1.4 meters at its deepest point, wherein earthworks for the basin are created within the property perimeter, and wherein the basin includes a basin perimeter and a bottom; constructing water containment walls on at least one section of the basin perimeter to form a waterfront perimeter, and covering the bottom of the basin with a non-permeable material, wherein the shape of the waterfront perimeter is curved and the basin has a maximum width of 300 meters; constructing a sloped access area on at least one section of the basin perimeter to form a beach access into the large water body; and constructing one or more barriers around the basin perimeter to cordon off an area to establish a controlled access area, wherein the controlled access area includes a beach access perimeter, and the barriers include at least one access point to selectively allow users into the controlled access area, whereby the users allowed entry into the controlled access area are able to use the beach access.

According to second aspect of the invention, there is provided a construction method for creating a swimming lagoon at a retail site, the retail site having a vacant building and a parking lot within its premises, the land parcel on which the retail site premises are located have a property perimeter, and the vacant building has a foundation and is located in the vicinity of the retail site, the method comprising: demolishing at least part of the retail site premises comprising the vacant building and/or the parking lot, wherein the demolition process includes excavating at least a 15 cm to 5 meter layer of the foundation of the vacant building and/or parking lot; excavating material having a volume of at least 4,000 m3 from an area within the retail site premises comprising the vacant building and/or the parking lot; forming a basin for a large water body having a surface area of at least 3,000 m2 and a minimum depth of at least 1.4 meters at its deepest point, wherein the earthworks are performed within the property perimeter, and wherein the basin includes a basin perimeter and a bottom; constructing water containment walls on at least one section of the basin perimeter to form a waterfront perimeter, and covering the bottom of the basin with a non-permeable material, wherein the shape of the waterfront perimeter is curved and the basin has a maximum width of 300 meters.

According to another aspect of the invention, the method includes constructing one section of the waterfront perimeter and basin perimeter to form a beach access area, the beach access area including one or more barriers to cordon off the beach access area, thereby establishing a controlled access area, and wherein the controlled access area includes at least one access point to selectively allow users into the controlled access area. Preferably, the remaining area about the basin perimeter is an open access area which may be freely accessed by users. However, it will be appreciated by those of skill in the art that the construction method may include constructing at least a portion of the waterfront perimeter such that access for users is controlled to enter that portion of the waterfront perimeter without the inclusion of a beach access area.

The advantages and features which characterize the inventions are pointed out with particularity in the claims annexed hereto and forming a part hereof. For a better understanding of the inventions, however, reference should be had to the drawings which form a part hereof and to the accompanying descriptive matter, in which there is illustrated and described preferred embodiments of the inventions.

BRIEF DESCRIPTION OF THE DRAWINGS

Referring to the drawings, wherein like numerals represent like parts throughout the several views.

DETAILED DESCRIPTION

Figure 1A:
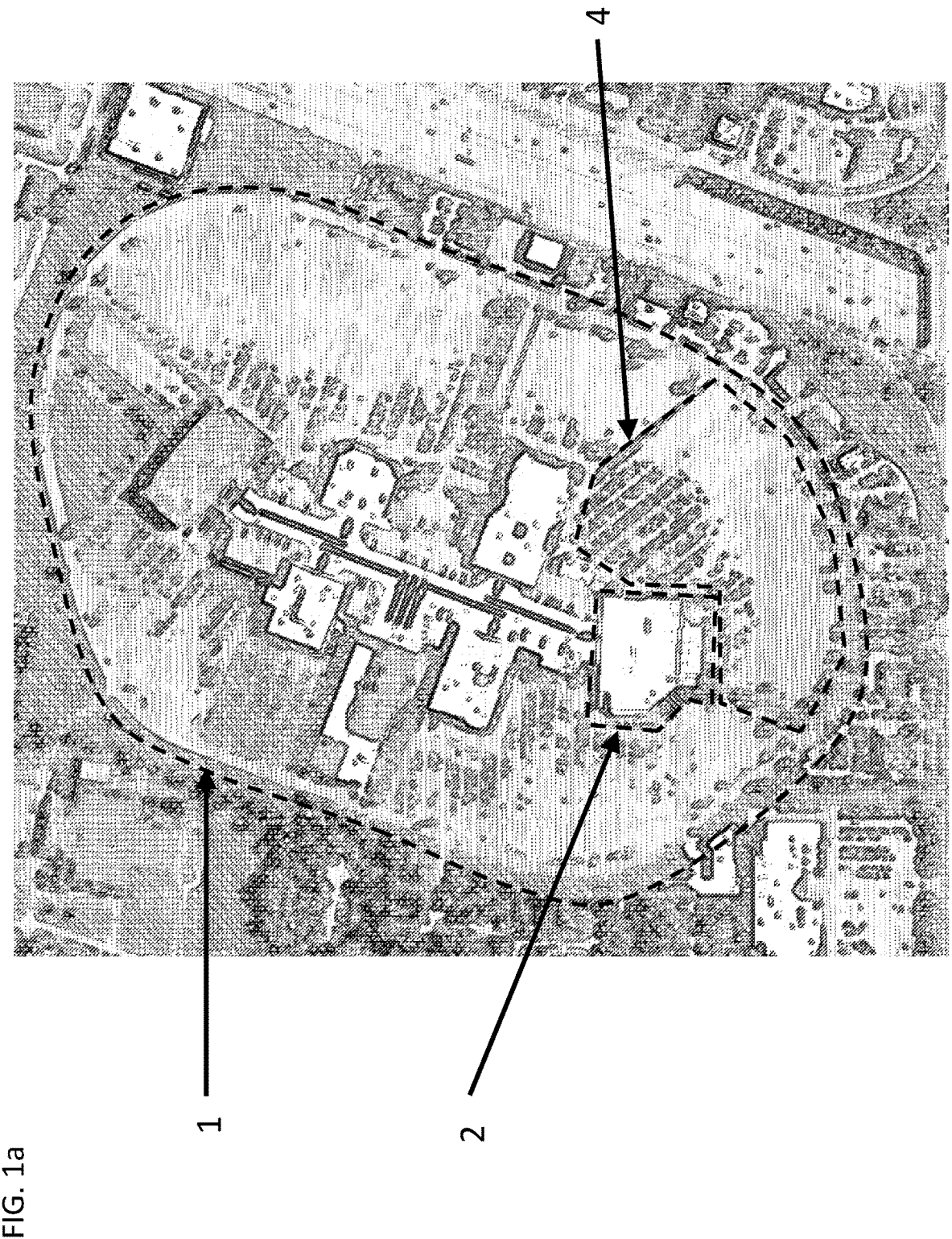
FIG. 1a shows an embodiment of a retail site (1), specifically a shopping mall with a big-box store (2) as its anchor, and associated parking space (4).

The present invention relates to a construction method for creating a restricted access swimming lagoon with beaches at a retail site, for swimming and the practice of water sports, wherein a portion of a shopping mall or "big-box" store (referred to generally herein as the "retail facilities") and/or a portion of an existing parking lot adjacent to the retail facilities, is demolished in order to generate a recreational complex that includes a swimming lagoon, which aims to provide a completely new setting within the retail site that aims to attract clients based on new consumer trends. Preferably, the recreational complex includes an area of the swimming lagoon where public access is controlled, and a beach area is located within the controlled access area. Embodiments, examples and preferred specifications are next described.

An advantage achieved through constructing embodiments in accordance with the invention, allows improving retail sites that face economic distress, or that have poor sales or low visitor numbers, and that have already undergone through the necessary city and state approval processes and assessments for the use of large number of visitors. The present invention discloses a construction method that includes demolishing a portion of a (A) shopping mall anchored big-box stores along with parking space, or a portion of a (B) standalone big-box store along with its parking space, in order to transform such retail facilities and/or their designated parking space, into a disruptive concept of a swimming lagoon as a recreational venue with innovative configurations and amenities, such as amphitheaters, to bring such spaces back to life.

Shopping mall anchored big-box stores or standalone big-box stores and/or their designated parking space, can be demolished either partially or completely to give entry to a new recreational venue and facilities that can help preserve the business by providing more than simply a point-of-sale to customers (e.g., by providing a new, and transformational shopping experience). As such, a complete and disruptive transformation is achieved where an old traditional shopping mall or standalone big box facility, is transformed into a recreational venue with a swimming lagoon with beaches offering a wide variety of public and private uses.

As previously discussed, these shopping malls and standalone big-box stores have no other short term alternative use that is massive, repeatable, and innovative. Therefore, these locations present a good opportunity to include an innovative recreational venue such as a swimming lagoon that has two different purposes: Provide a recreational setting and ambiance for the implementation of surrounding restaurants, amphitheaters, stores, kiosks, promenades, cafes, bars, stages and event facilities, among others, and provide a paid access for the public to a private portion of the swimming lagoon. The result is a unique urban beach lifestyle for recreational purposes, such as swimming and the practice of water sports.

When a A) shopping mall with a big-box store as its anchor includes a lagoon, preferably with a beach area, within its retail site (i.e., by demolishing a portion of its premises), the retail site is completely revitalized and changes its lifestyle and increases its spectrum of activities, reaching a higher consumer population and gaining new consumers that will be able to use such premises as well as the shopping mall premises.

Also, for B) standalone big-box stores, when the present invention's construction method is applied, preferably a swimming lagoon with beaches is constructed within the retail site, by demolishing a portion of its premises, where the retail site is completely transformed providing a new destination for clients and consumers.

Consumers and visitors will be able to enjoy a longer period of time at the new retail facility preferably including a controlled access swimming area in the swimming lagoon, as well as common areas for shopping, eating, lounging and relaxing. A non-comprehensive list of amenities and recreational facilities at the retail site and surroundings may include entertainment facilities such as bowling centers, game centers, cinemas, theaters, ice skating rinks, skating centers, wave machines, toddler and kids areas, among others. The retail site may also comprise residential facilities, office facilities, and temporary and non-temporary lodging facilities such as hotels and motels.

The visitors will, at the same time, be able to use additional amenities and enjoy a picturesque lagoon with recreational surroundings—such as amphitheaters—and practice water sports in the swimming lagoon (i.e., preferably upon paying an entry fee). This type of recreational area is unprecedented, and it is anticipated to have a considerable impact on the retail market. Further, future successful retail designs may also incorporate the disruptive concept according to the present invention.

This innovative recreational venue with a swimming lagoon may increase the number of visitors to the retail site, where the swimming lagoon will act as an additional anchor to attract a wide variety of people and their families. By incorporating a recreational venue such as a swimming lagoon, the retail business is expected to improve by increasing visitor numbers, and also by attracting new public that normally would not visit conventional retail facilities such as a shopping mall with a big-box store as its anchor. In addition to increasing visitor numbers, the recreational venue acts as an additional business (e.g., through fees for water sports, fees for access into a swimming area, and for fees paid by amenities located near/around the lagoon) to help support the complex.

As mentioned before, one alternative is to transform the shopping malls into lifestyle centers. However, an additional and important factor relates to the high cost of transforming such spaces into lifestyle centers with office/residential space, and large transformations of the space and configurations, which are not new concepts. For example, it has been estimated that lifestyle centers construction costs are approximately double than traditional strip centers and shopping malls, with a construction cost of about $200 to $250 per square feet, where an average lagoon or swimming lagoon has costs of up to 10 times smaller.

The construction method of the present invention contemplates a partial or complete demolition of retail sites, such as a vacant big-box anchor store in a shopping mall or a standalone big-box store, together with a portion of the adjacent or proximate respective parking spaces, to repurpose such retail sites by creating a recreational venue with a swimming lagoon. Preferably the recreational venue includes a number of amenities and a swimming area with beaches.

Typically, the retail site has a vacant building and an associated parking lot within its premises, wherein the retail sites comprise a A) shopping mall with an anchor big-box store, or a B) standalone big-box store site, each with its associated parking space. A retail site must be provided in order to plan and coordinate the demolition process and the construction of the swimming lagoon with beaches.

The retail site premises are located within a land parcel that has a property perimeter, delimiting the retail site including its retail facilities along with its parking space and connecting roads.

In more detail, the process comprises demolishing at least part of the retail site, referred to as the demolition site, which comprises the vacant building and/or its associated parking lot. As previously mentioned, the retail site comprises either a A) shopping mall with a big-box store as its anchor, or B) a standalone big-box store, along with at least a portion of their associated parking spaces.

The demolition process must remove and excavate a layer of the foundation of the vacant building and/or associated parking lot, wherein the process includes excavating a layer of between 15 cm to 5 meters of the foundation of the vacant building and/or associated parking lot, in order to provide the necessary excavated volume for the swimming lagoon construction.

The demolition process comprises excavation with machinery up to a depth of 20 centimeters over the final excavation level, where the final 20 cm may be excavated manually.

Once the design excavation level is achieved, the bottom soil must be compacted to achieve a 95% Modified Proctor Density. A 95% Modified Proctor Density means that the soil at the bottom is compacted to 95% of its maximum dry density. This aims to reduce post-construction settlements rates of such soil. As a reference, the Modified Proctor test uses a 4-inch-diameter mold which holds 1/30 cubic feet of soil, and uses a 10 lb. hammer falling through 18 inches, with 25 blows on each of five lifts, for a compaction effort of about 56,250 ft-lbf/ft$^3$. This can also be explained such that the bottom of the excavations are to be compacted to a 95% of the Maximum Dry Compacted Density, based on the Modified Proctor test (ASTM D1557-02) when the soil type has more than a 12% material passing under a N°200 mesh (opening of 0.075 mm). When the soil type has less than a 12% material passing under a N°200 mesh (opening of 0.075 mm), the soil must be compacted to achieve no less than 80% of its Relative Density.

The process also includes excavating a volume of at least 4,000 m3, preferably at least 7,000 m3 from an area within the retail site premises, which comprise the vacant building and the parking lot. This excavation material preferably will serve as the earthworks necessary to provide the basin of the swimming lagoon, wherein such earthworks are created within the property perimeter, and wherein the basin includes a basin perimeter and a bottom. It will be appreciated by those of skill in the art that the excavated material may prove to be unsuitable for the earthworks. For example the material may include a mixture of rocks, cement, tar or other detritus. In such an event, suitable fill and other materials may be brought to the site for the earthworks.

The basin for the lagoon is preferably designed and constructed so that its surface area is at least 3,000 m2, preferably at least 5,000 m$^2$, and its deepest point has a minimum depth of 1.4 meters.

Containment walls are preferably constructed on at least one section of the basin perimeter, as to form a waterfront perimeter that is arranged and configured to contain the water within the basin. Such containment walls require a backfill material in order to provide structural integrity to such walls.

In addition, a sloped area is preferably constructed in at least one section of the basin perimeter in order to create a beach access perimeter. The sloped area is constructed such that the slope of the beach access perimeter is between 5% and 30%. The sloped area may require construction or placement of a support slab in order to provide structural stability on such location. For example, the sloped area may have high foot traffic of users accessing the swimming lagoon.

The shape of the waterfront perimeter is preferably curved to create a more natural aspect of the swimming lagoon. Additionally, the basin has a maximum width of 300 meters at its widest point. The width of the lagoon is defined as the measurement or extent of the lagoon from side to side; the lesser of the two dimensions of the lagoon measurements. The length of the lagoon is defined as the largest dimensional measurement of the lagoon.

The maximum width of the lagoon is limited in up to 300 meters, as there is little visual impact to be gained at eye level with larger distances. Therefore the retail site does not need to have extremely wide lagoons as they use too much surface with no measurable improvement on the visual impact to visitors.

The bottom of the basin is covered with a non-permeable material, in order to act as a water containment structure. The non-permeable material comprises a plastic liner of at least 1 mm of thickness, among other solutions.

Therefore, the basin, along with its containment walls and/or sloped areas creates a swimming lagoon in the previously excavated volume that forms the basin.

The swimming lagoon is built in order to provide a new and innovative amenity that allows generating a completely new user experience in retail sites. Embodiments herein are directed to a swimming lagoon that is arranged and configured to optimize visitor experience. Specifically, the lagoon is arranged and configured in a way such that the relationship between all elements and purposes of the different areas of the lagoon enable guests and visitors to enjoy the experience as well as interact with the different areas that may be designated for different purposes. A beach area included in the swimming lagoon is preferred. However, there may be instances when a swimming area is impractical or is otherwise not desired for the specific site.

Further, the swimming lagoon is also preferably constructed in a manner so that it can be used not only for swimming purposes, but also for the practice of several water sports, such as kayaking, stand-up-paddling, boating, water skiing, among others.

Although the swimming lagoon is man-made, it preferably includes shapes that tend to imitate natural geometries, and comprises a slightly elongated shape to provide visitors with at least one vantage point to experience dramatic views of the lagoon and its surroundings.

Additionally, the swimming lagoon comprises different elements and areas for providing an optimized visitor experience, preferably including at least one controlled access area. This is achieved by constructing one or more barriers around the basin perimeter of the swimming lagoon, in order to cordon off an area of the swimming lagoon to establish a controlled access area with a restricted access swimming lagoon located within. In that case, the controlled access area includes at least one beach access perimeter within the basin perimeter, thereby providing a new recreational amenity and venue for visitors. The barriers comprise at least one access point to selectively allow users into the controlled access area. The remaining area about the basin perimeter can optionally be an open access area that is freely accessed by users. However, the controlled access area preferably requires a ticket, voucher or other payment of an entry fee for accessing such area.

Controlled access areas may be created about the swimming lagoon for other purposes as well. However, it is important to include separate access points for both controlled access areas and open access areas of the lagoon. This enables visitors to clearly participate in either one or both areas depending on their purpose for visiting the retail site and lagoon, including natural articulations and man-made focal points along the edge to encourage walkability and foster visitors with a sense of discovery. The swimming lagoon can be illuminated through a lighting system, in order to allow nighttime uses.

As previously mentioned, it is preferred that the lagoon include at least one controlled access area for visitors for at least one beach area, wherein the beach area comprises a sandy beach and sloped transition into the swimming lagoon. The controlled access area may be designed such that the total beach area to lagoon area ratio is 1:2. Further, the beach area is preferably placed and designed considering general summer sun orientation, optimizing visitor experience.

The construction of an amphitheater in the surroundings of the lagoon and nearby the beach area(s) is also preferred. This creates an opportunity to hold events such as concerts and festivals, among others. Other activities include music on the beach, dining on the beach, and other events on the beach such as weddings and sports events, among many others. The surroundings of the beach may include cafes, bars, restaurants, beach centers, event centers, and similar facilities and amenities.

The at least one open access area comprises optimized waterfront perimeter surrounding the swimming lagoon that has an unobstructed view of the lagoon and is not directly in front of any beach areas or esplanades that could affect the aesthetics of the landscape. The open access area comprises restaurants, cafes, stores, bars, and similar facilities in its surroundings.

Additionally, the open access area, which is freely accessible by users, it has at least one point with a 120° unobstructed view of the swimming lagoon, with a beach-free radius of 50 meters, to maximize visitor experience and avoid the noise from beach areas.

A screen may also be provided in the vicinity of the swimming lagoon to broadcast content and house events and shows, and can be located in the same sector as the amphitheaters, to create a new event venue having the swimming lagoon as its backdrop.

Demolition Site and Swimming Lagoon

Figure 1B:
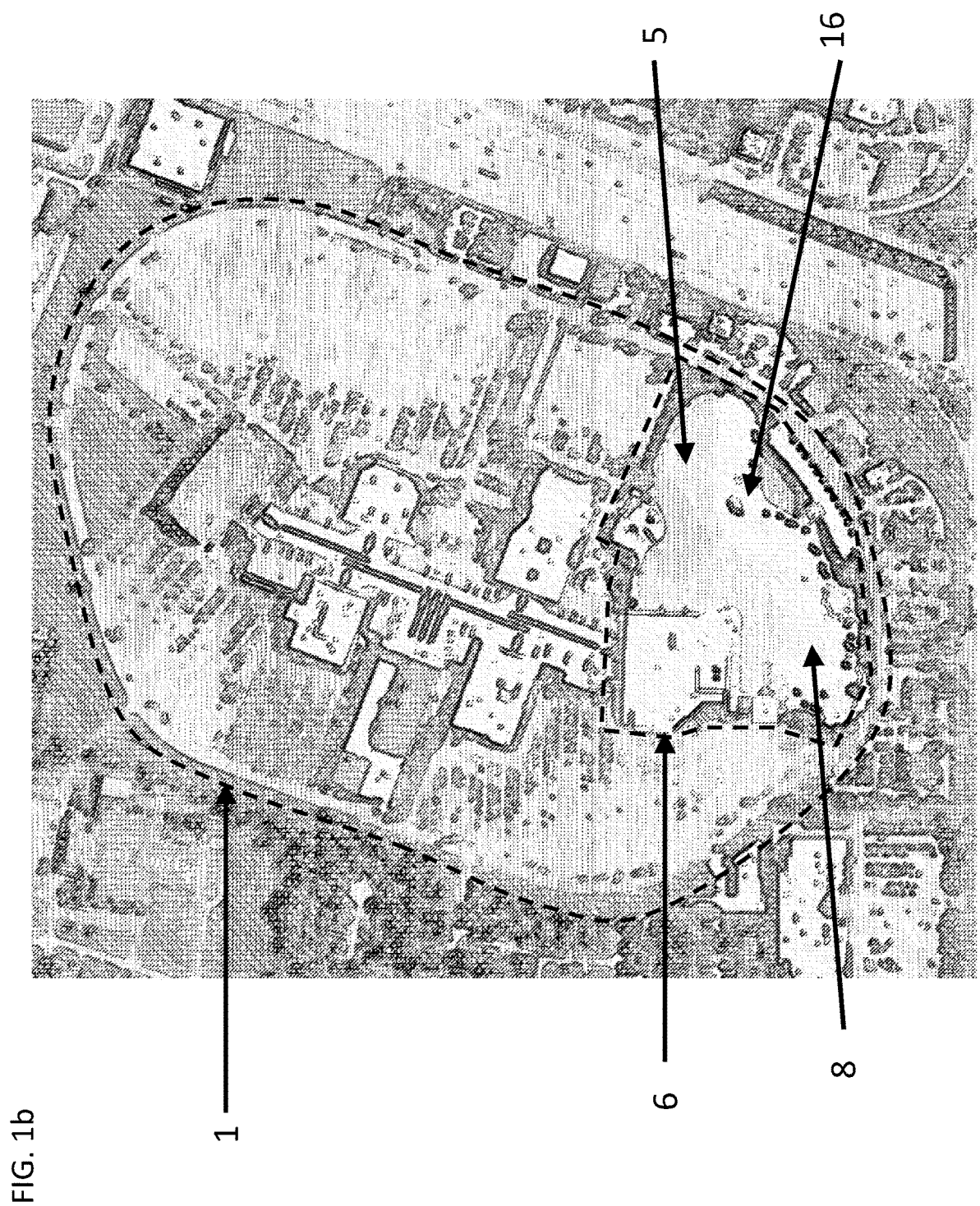
FIG. 1b shows the same embodiment as FIG. 1a, wherein partial demolition has been performed at the demolition site (6) contained within the retail site (1), allowing to generate a swimming lagoon (5) with beach areas (8) and an amphitheater (16).
Figure 1C:
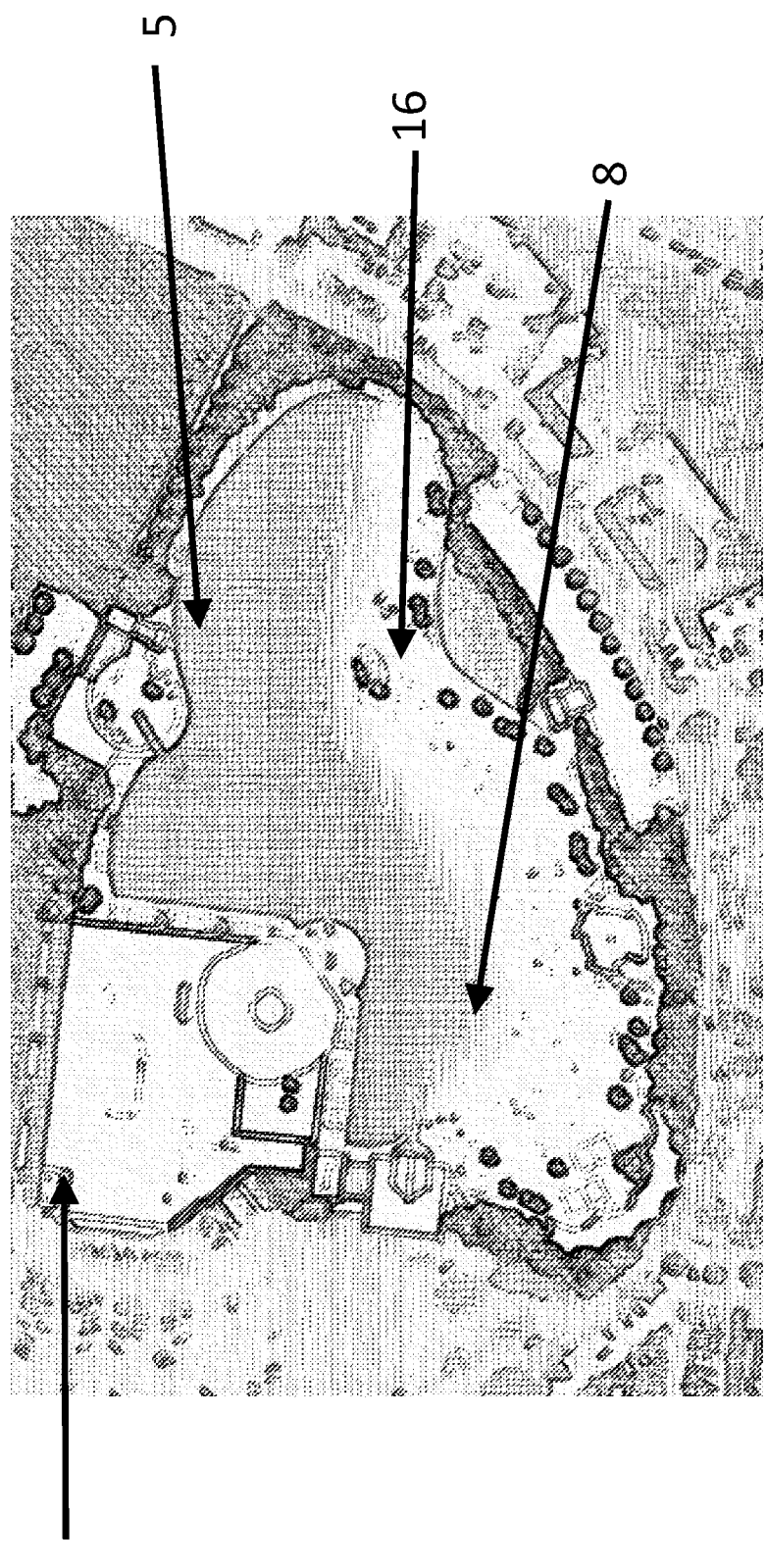
FIG. 1c shows a close-up of the swimming lagoon (5) with beaches (8) and an amphitheater (16) from FIG. 1b, showing also a repurposed big-box store (7).

Turning now to FIG. 1a, a prophetic retail facility (with a premises boundary 1) with a retail site including a shopping mall anchored big-box store 2 and adjacent parking space 4 is shown. FIG. 1b illustrates the demolition of a portion of parking space 4 of FIG. 1a in order to provide a swimming lagoon 5. In FIG. 1b, a representative boundary of a demolition area 6, swimming lagoon 5, beach area 8 and amphitheater 16 are shown. These areas may be seen in more detail in FIG. 1c in which the original big-box store, is now identified as repurposed big-box store 7.

Figure 2A:
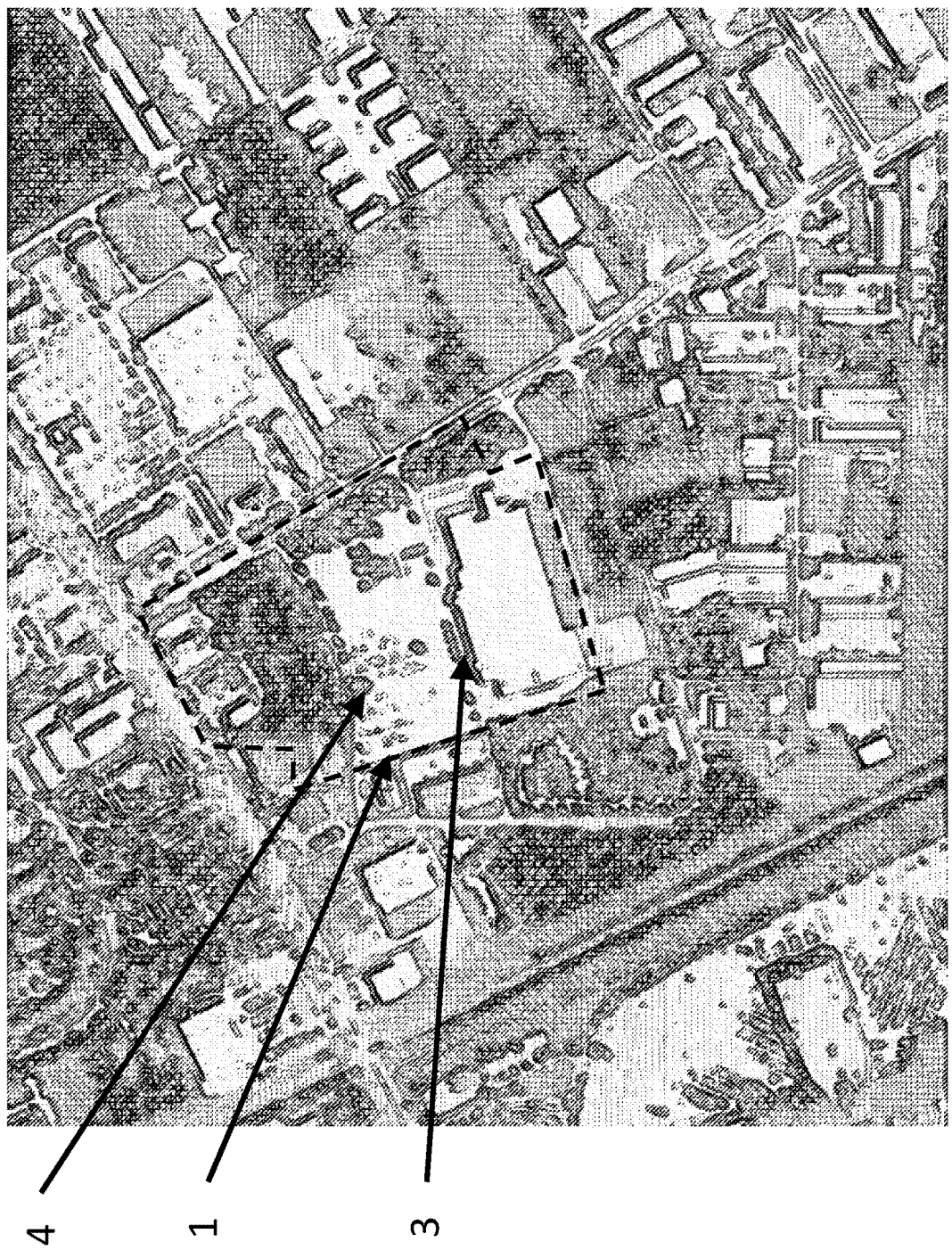
FIG. 2a shows an embodiment of a retail site (1), specifically a standalone big-box store (3) and associated parking space (4).
Figure 2B:
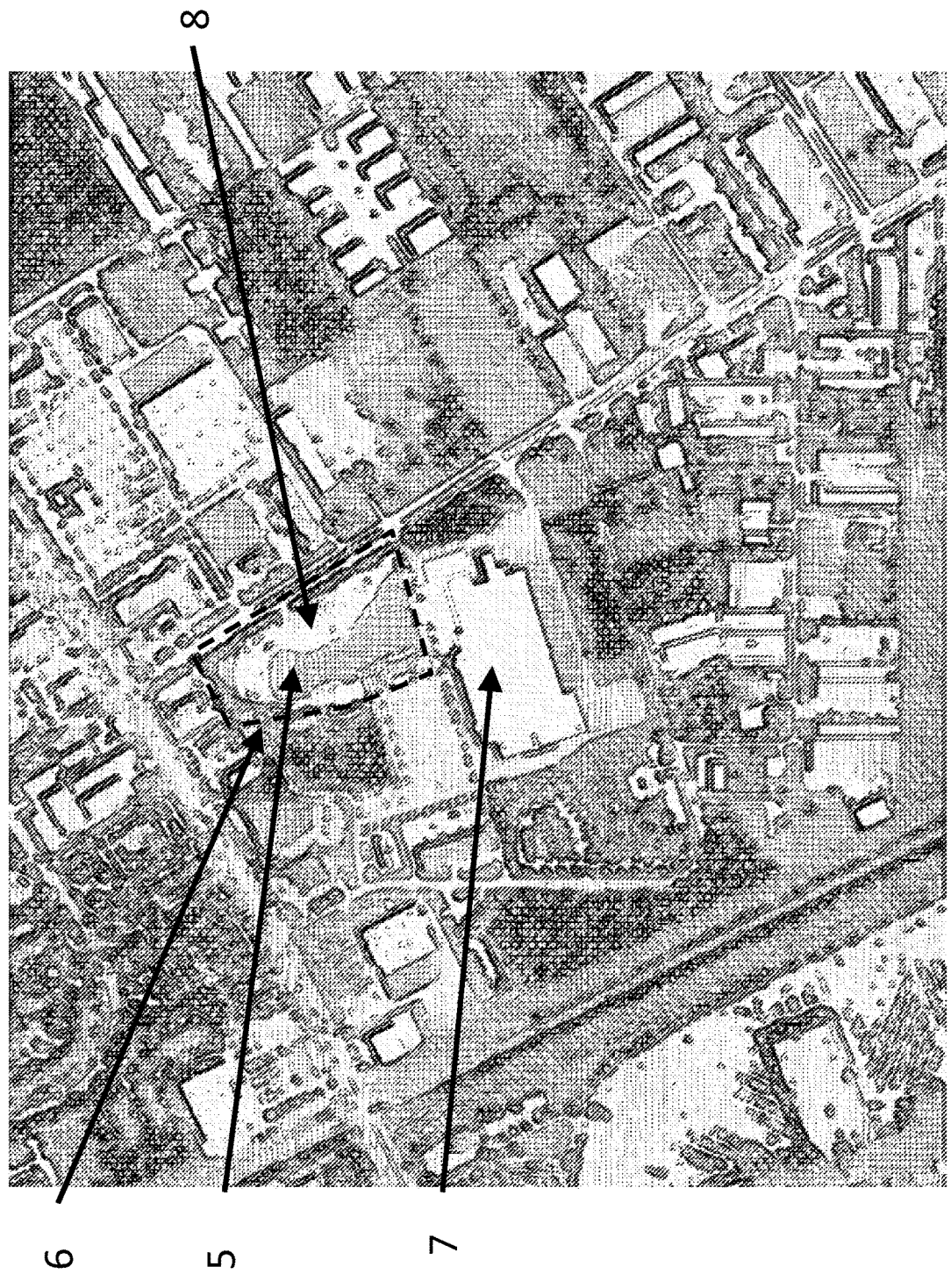
FIG. 2b shows the same embodiment as FIG. 2a, wherein the demolition site (6) is a portion of the original associated parking space (4), and a swimming lagoon (5) with beaches (8) is generated, transforming the retail site and providing a repurposed big-box store (7).

Alternatively, FIG. 2a illustrates a prophetic retail site stand-alone big box store 3 with parking 4 and with premises boundary 1. FIG. 2b illustrates the demolition of the parking area 4 of FIG. 2a in order to provide a swimming lagoon 5. In FIG. 2b, a representative boundary of a demolition area 6, swimming lagoon 5, and beach area 8 are shown.

Figure 3A:
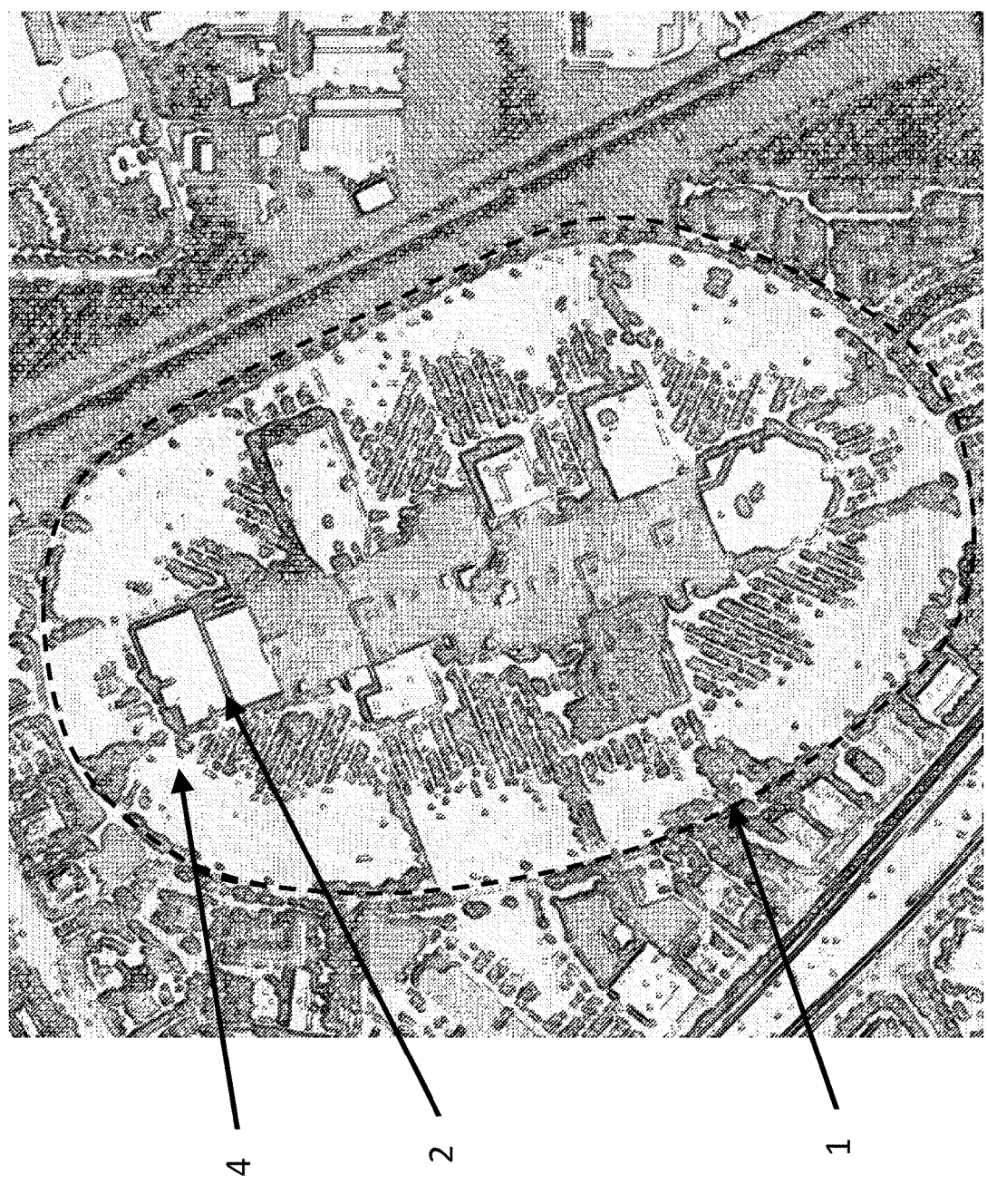
FIG. 3a shows another embodiment of a shopping mall site, where the retail site (1) is shown along with the associated parking space (4), and an anchor big-box store (2) in the upper corner of the shopping mall.
Figure 3B:
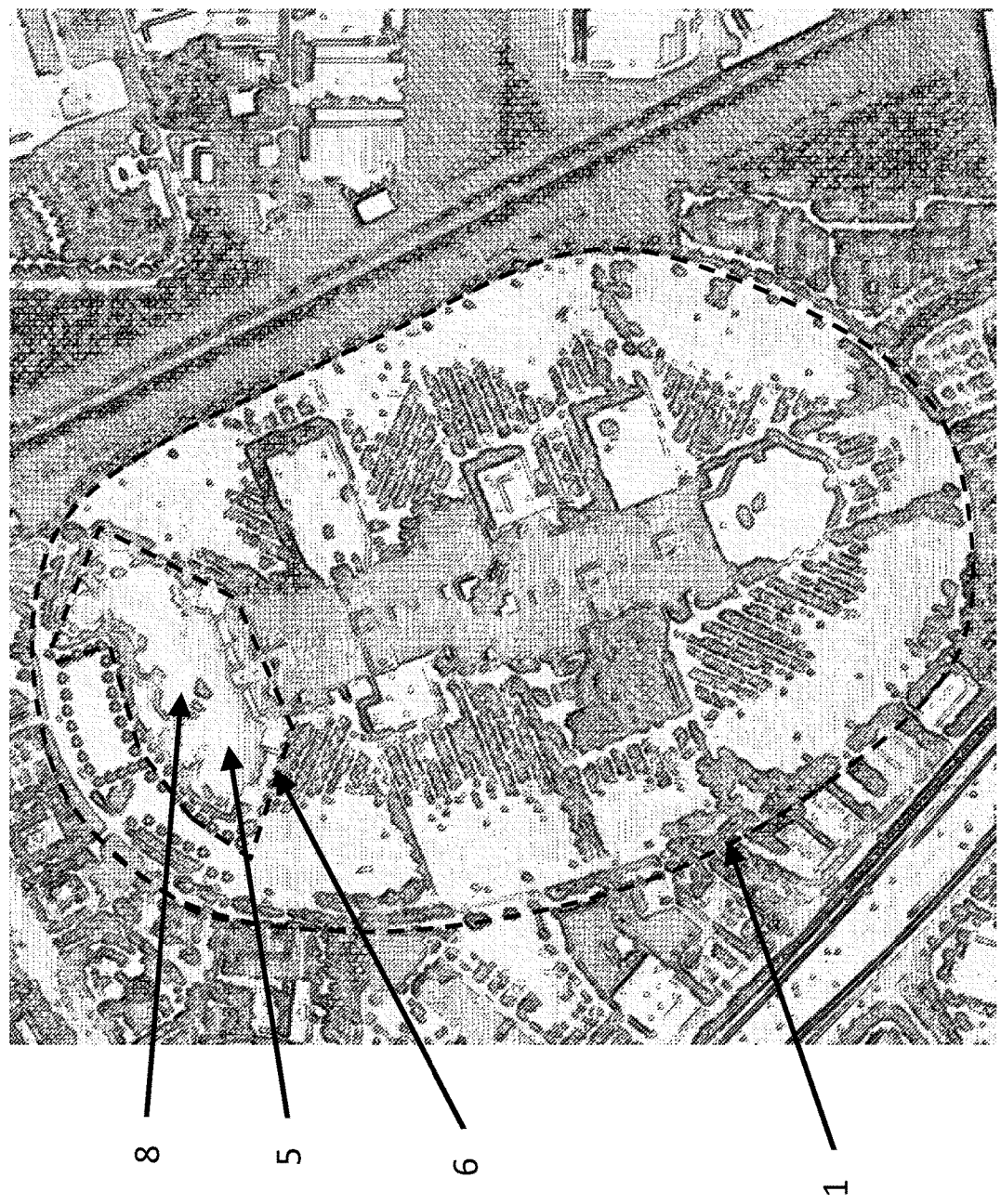
FIG. 3b shows the same embodiment as FIG. 3a, where the demolition site comprises a portion of the designated parking (4) and the big-box store (2), which gives place to the swimming lagoon (5) with beaches (8).
Figure 3C:
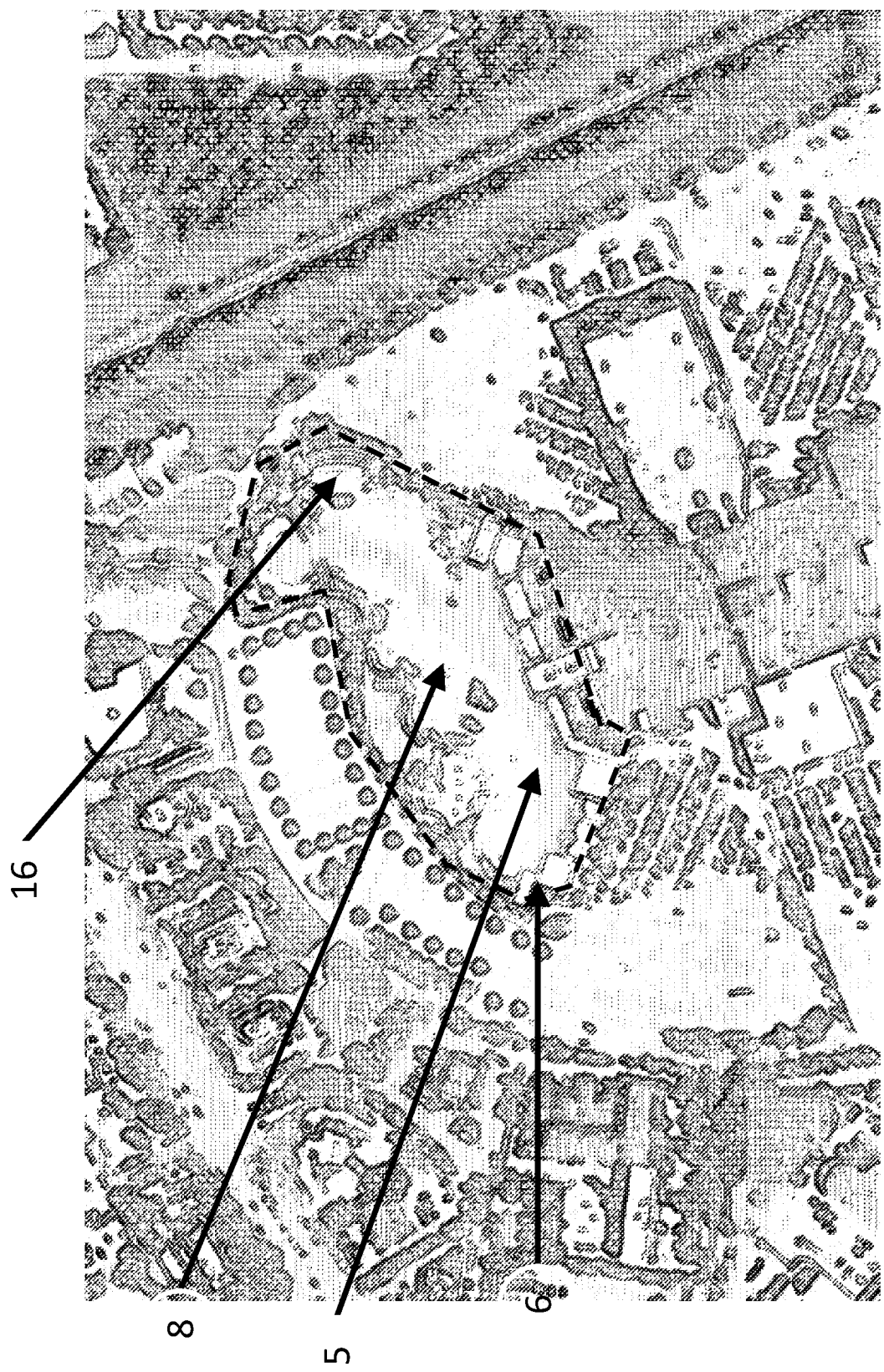
FIG. 3c shows a close-up of FIG. 3b, showing the demolition site (6), the swimming lagoon (5) with beaches (8) and an amphitheater (16).

Another alternative is shown in FIGS. 3a, 3b and 3c. More specifically, FIG. 3a shows another embodiment of a retail site, specifically a shopping mall, where the retail site perimeter 1 is shown along with the associated parking space 4, and an anchor big-box store 2 in the end corner of the shopping mall. FIG. 3b shows the same prophetic embodiment as FIG. 3a, where the demolition site 6 comprises a portion of the designated parking space 4 and the big-box store 2. The space is demolished in order to give place and create a swimming lagoon 5 with beaches 8. Similarly, FIG. 3c includes a more detailed view of FIG. 3b, showing the demolition site 6, the swimming lagoon 5 with beaches 8, and an amphitheater 16.

Figure 4:
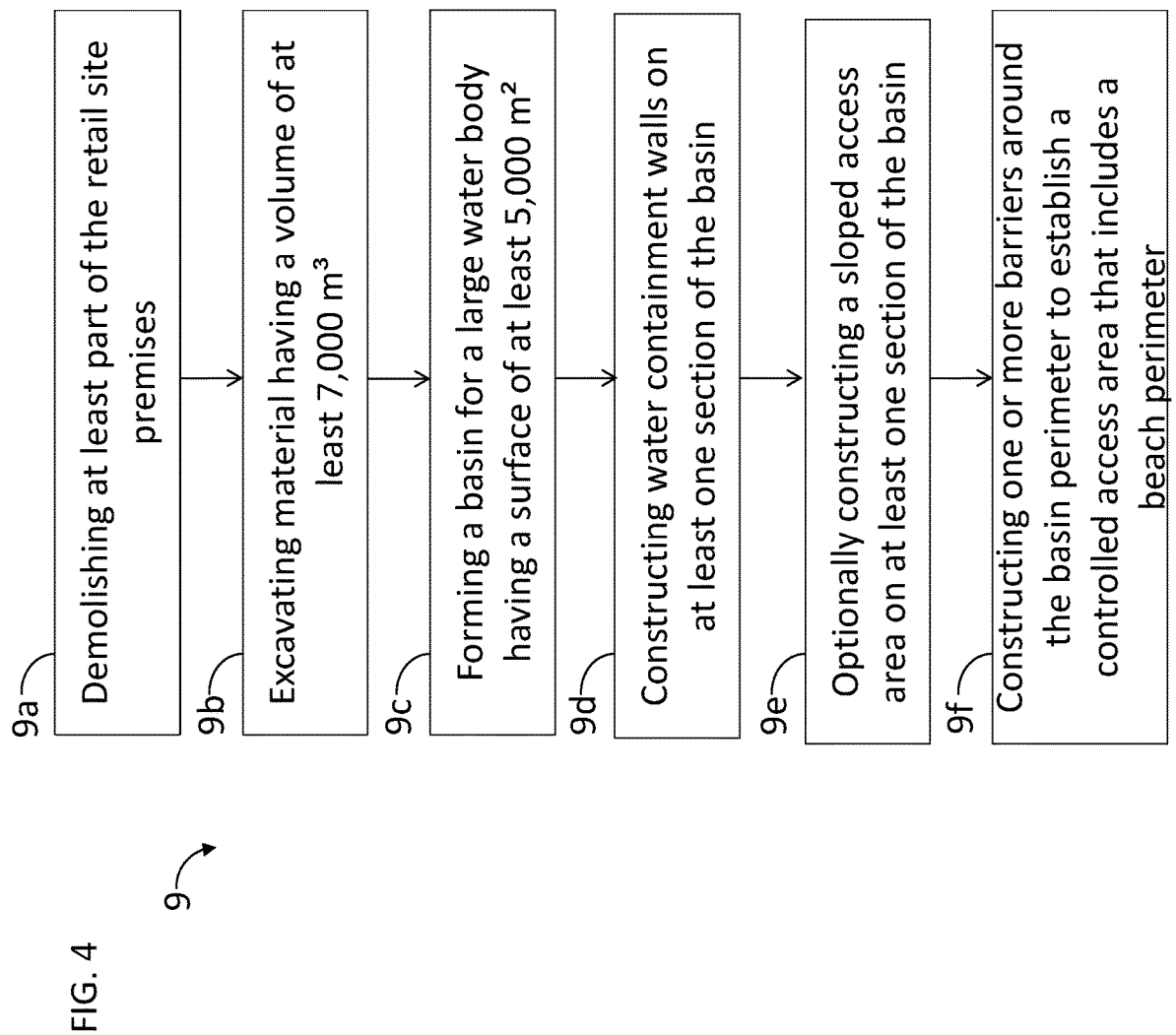
FIG. 4 shows the construction method from the present invention.

FIG. 4 illustrates a preferred construction method 9 in accordance with the principles of the present invention. As previously noted, the repurposing of the big box store and the adjacent/proximate parking area into a recreation complex with a swimming lagoon—and preferably a swimming area provide an amenity that transforms the area into a desirable destination. The first step 9a is to demolish at least part of the retail site premises. The next step 9b is to excavate materials having a volume of at least 4,000 m3, preferably at least 7,000 m$^3$. Then at step 9c a basin is formed for large water body having a surface area of at least 3,000 m2, preferably at least 5,000 m$^2$, this may include in part earthworks from the excavated material and/or from additional materials brought to the site. At step 9d, water containment walls are constructed on at least one section of the basin. At step 9e, a sloped access area in at least one section of the basin is optionally created in the event a swimming area is included.

And at 9f, barriers are constructed around the basin perimeter to establish a controlled access area for a beach or other area in which user controlled access is desired.

Figure 5:
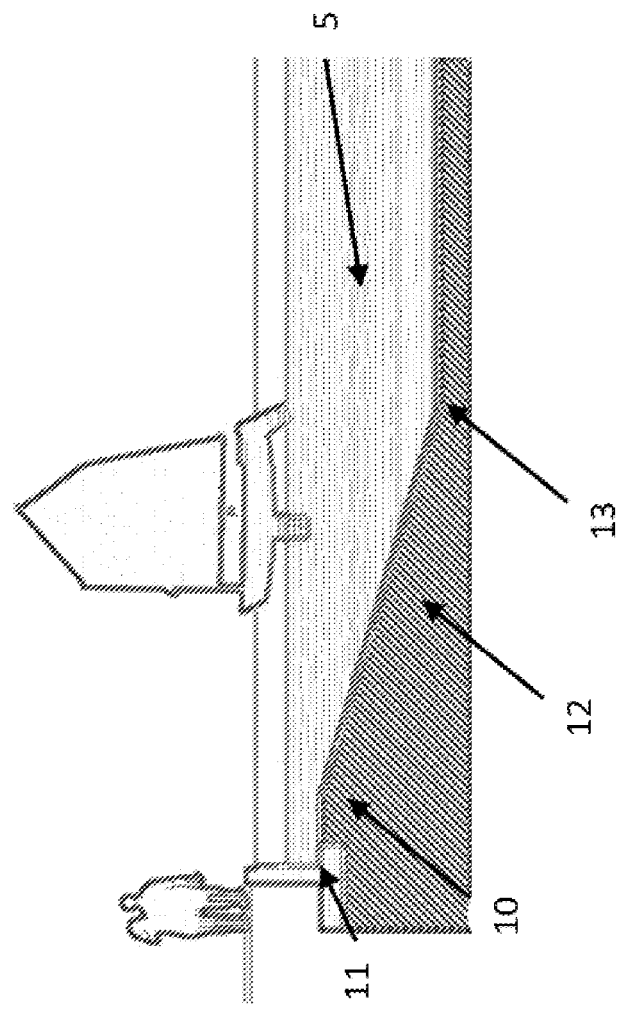
FIG. 5 shows a side view of an embodiment of the containment walls (10) for the basin of the swimming lagoon (5), showing backfill material (11) to provide structural stability to the containment wall, and wherein a non-permeable material (13) allows containing the water body, and is located on top of the bottom soil (12).
Figure 6:
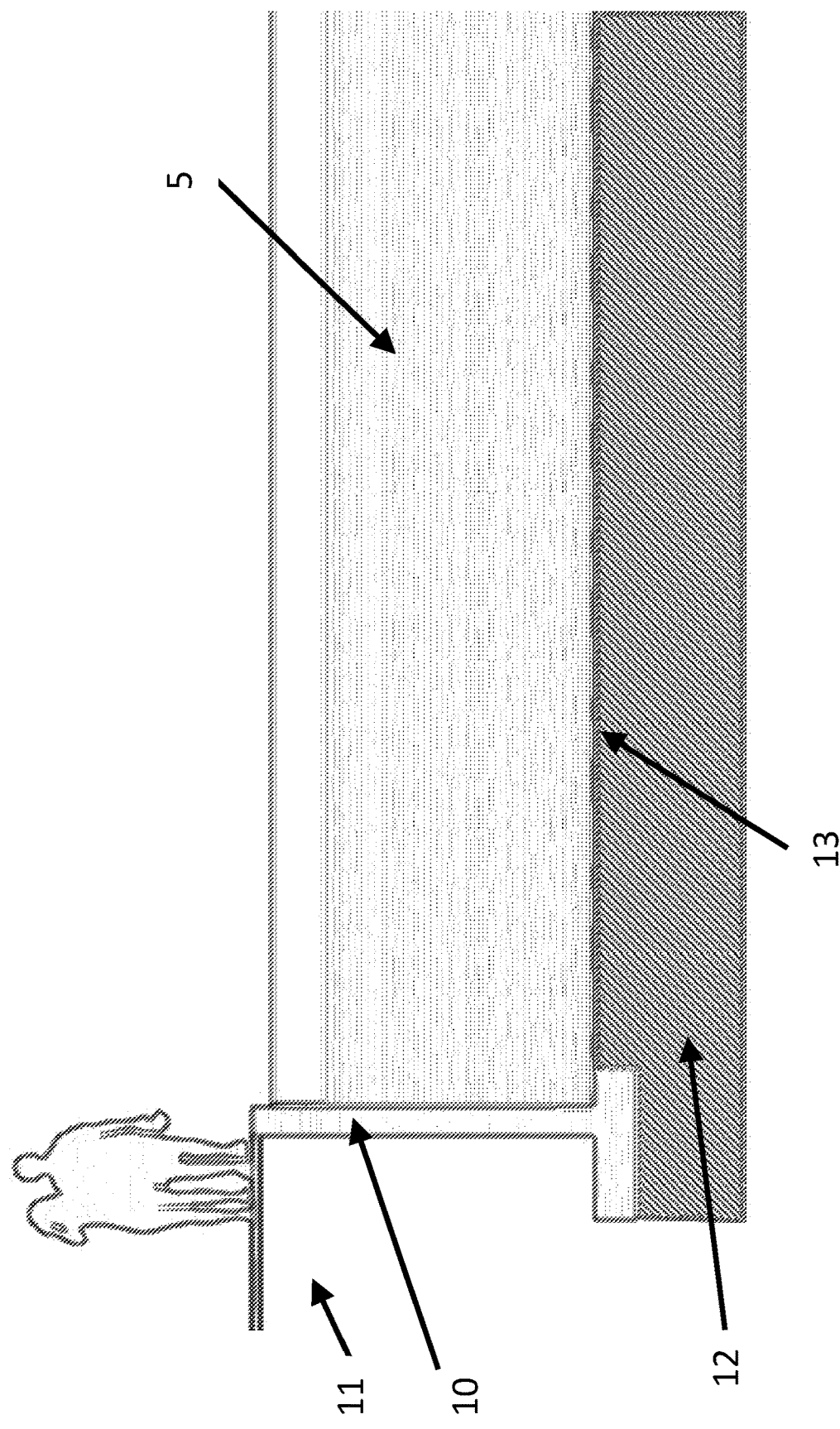
FIG. 6 shows a side view of another embodiment of the containment walls (10) for the basin of the swimming lagoon (5), showing backfill material (11) to provide structural stability to the containment wall, and wherein a non-permeable material (13) allows containing the water body, and is located on top of the bottom soil (12).

FIGS. 5 and 6 show side views of embodiments of the containment walls 10 for the basin of the swimming lagoon 5. First referring to FIG. 5, backfill material 11 is included to provide structural stability to the containment wall 10. A non-permeable material 13 contains the water in the large water body (e.g., the swimming lagoon 5), and is located on top of the bottom soil 12. FIG. 5 illustrates an embodiment in which the depth of the lagoon 5 near the wall is relatively shallow. Next FIG. 6 shows a side view of another embodiment of the containment walls 10 for the basin of the swimming lagoon 5, showing backfill material 11 to provide structural stability to the containment wall, and wherein a non-permeable material 13 contains the water within the large water body, and is located on top of the bottom soil 12. FIG. 6 illustrates an embodiment in which the depth of the lagoon 5 near the wall is relatively deep.

Figure 7:
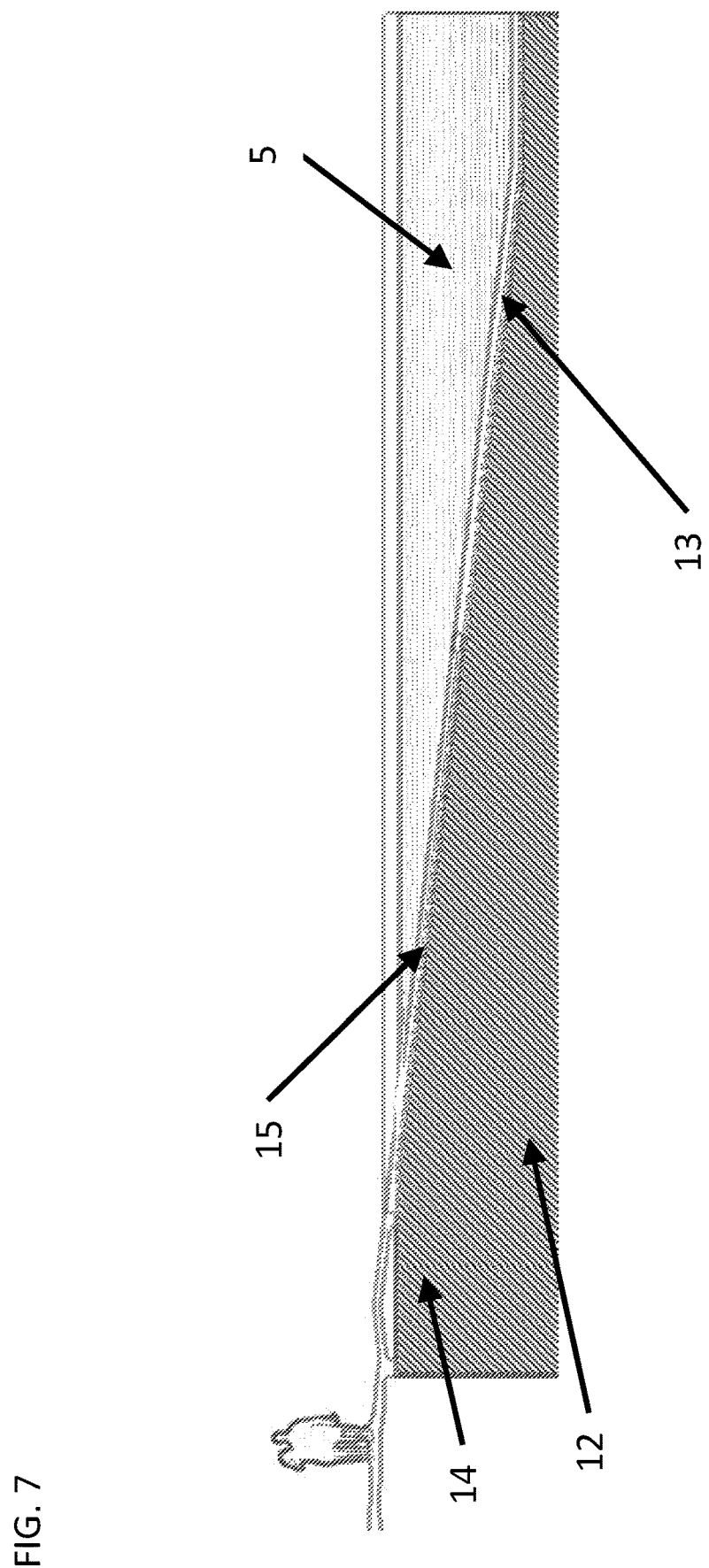
FIG. 7 shows a side view of an embodiment of a sloped access (15) to the basin of the swimming lagoon (5), wherein a support slab (14) is provided underneath a portion of the sloped access (15), and the non-permeable material (13) allows containing the water body.

FIG. 7 shows a side view of an embodiment of a sloped access 15 to the basin of the swimming lagoon 5, wherein a support slab 14 is provided underneath a portion of the sloped access 15, and the non-permeable material 13 for containing the water in the large water body.

Preferably, the sloped access 15 includes a zero-entry edge into the water that preferably resembles the natural, soft slope of a tropical beach or a natural lake. The zero-entry edge creates an entry into the lagoon starting generally at an elevation slightly above the mean water level of the lagoon 5, passing through the mean water level at the basin perimeter and continuing to drop below the mean water surface toward the center of the swimming lagoon 5.

The slope of the zero-entry edge, is preferably between 5% and 30%. This range generally resembles natural beach edges with soft slopes and provides people on the beach area and bathers an unobstructed and good view of the clear waters.

LISTING OF ELEMENTS SHOWN IN THE DRAWINGS

Number Description
1 Retail Site
2 Shopping Mall Anchored Big-Box Store
3 Standalone Big-Box Store
4 Associated Parking Space
5 Swimming Lagoon
6 Demolition Site
7 Repurposed Big-Box Store
8 Beach Area
9 Construction Method
10 Containment Wall
11 Backfill
12 Soil
13 Non-Permeable Material
14 Support Slab
15 Sloped Access
16 Amphitheater

Example I

The disclosed information is illustrative, and other embodiments exist and are within the scope of the present invention.

A land having a total surface of 50,000 m2 was provided, which included a standalone big-box store covering a surface of approximately 9,500 m2 that remained closed for a certain period of time and had no alternative use and therefore a swimming lagoon with a beach access at the retail site was desired. A demolition process of the structure of the standalone big-box store was conducted which included an additional 2 meter layer of excavation of the foundation of the site where the standalone big-box store was originally located. Subsequently, 6,000 m3 of material was excavated out of the site in order to form a basin having a depth of 1.8 at its deepest point to contain a large water body. The basin was provided with construction works to include containment walls and to cover its bottom with a plastic liner. Additional construction works were performed to include a sloped access area to form a beach access into the large water body, a perimeter including barriers to form a controlled access into the large water body and a curved waterfront perimeter that created a more natural aspect of the swimming lagoon.

It should be understood that even though numerous characteristics and advantages of the present invention have been set forth in the foregoing description, together with details of the structure and function of the invention, the disclosure is illustrative only and changes may be made in detail, especially in matters of the supporting hardware, components and devices, and to the full extent indicated by the broad general meaning of the terms in which the appended claims are expressed.

What is claimed is:

1. A construction method for creating a swimming lagoon with a beach access at a retail site, the retail site premises include a shopping mall with a big-box store or a standalone big-box store and an adjacent parking lot, the big-box store is vacant, the land parcel on which the retail site premises are located has a property perimeter, and the big-box store has a foundation and is located within the area of the retail site, the method comprising:
   a. demolishing at least part of the retail site premises comprising the vacant building and/or the parking lot, wherein the demolition process includes excavating at least a 15 cm to 5 meter layer of the foundation of the vacant building and/or parking lot;
   b. excavating material having a volume of at least 4,000 m3 from an area within the retail site premises comprising the vacant building and/or the parking lot;
   c. forming a basin for a large water body having a surface area of at least 3,000 m2 and a minimum depth of at least 1.4 meters at its deepest point, wherein earthworks for the basin are created within the property perimeter, and wherein the basin includes a basin perimeter and a bottom;
   d. constructing water containment walls on at least one section of the basin perimeter to form a waterfront perimeter, and covering the bottom of the basin with a non-permeable material, wherein the shape of the waterfront perimeter is curved and the basin has a maximum width of 300 meters;
   e. constructing a sloped access area on at least one section of the basin perimeter to form a beach access into the large water body; and
   f. constructing one or more barriers around the basin perimeter to cordon off an area to establish a controlled access area, wherein the controlled access area includes a beach access perimeter, and the barriers include at least one access point to selectively allow users into the controlled access area, whereby the users allowed entry into the controlled access area are able to use the beach access.

2. The construction method of claim 1, wherein the area about the basin perimeter not located within the controlled access area forms an open access area which may be freely accessed by users.

3. The construction method of claim 1, further comprising building restaurants, kiosks, stores, cafes, and bars in the vicinity of the waterfront perimeter.

4. The construction method of claim 1, wherein the demolition process comprises excavation with machinery up to a depth of 20 centimeters over the design excavation level, where the final 20 cm are excavated manually.

5. The construction method of claim 1, wherein step b) comprises excavating material having a volume of at least 7,000 m3.

6. The construction method of claim 1, wherein step c) comprises forming a basin for a large water body having a surface area of at least 5,000 m2.

7. The construction method of claim 1, wherein
when the soil type has more than a 12% material passing under a N°200 mesh (opening of 0.075 mm), the bottom soil must be compacted to achieve a 95% Modified Proctor Density, also referred to as the Maximum Dry Compacted Density
when the soil type has less than a 12% material passing under a N°200 mesh (opening of 0.075 mm), the soil must be compacted to achieve no less than 80% of its Relative Density.

8. The construction method of claim 1, further comprising placing sand in the surroundings of the beach area.

9. The construction method of claim 1, the beach access having a sloped transition into the basin of between 5% and 30%.

10. The construction method of claim 1, whereby the lagoon is used for swimming, for the practice of water sports, and for housing shows and events.

11. The construction method of claim 1, wherein the sloped access area is constructed with a support slab to provide structural stability to such area.

12. The construction method of claim 1, wherein the open access area has at least one point with a 120° unobstructed view of the water surface, with a beach-free radius of 50 meters, whereby user experience is maximized and noise from the beach area is minimized.

13. The construction method of claim 1, wherein the non-permeable material that covers the bottom of the basin comprises a plastic liner of at least 1 mm of thickness.

14. The construction method of claim 1, wherein the swimming lagoon is man-made, and has shapes that tend to imitate natural geometries.

15. The construction method of claim 1, wherein separate access points are included, for both controlled access areas and open access areas, so that visitors can participate in either one or both areas depending on their purpose for visiting the retail site and the swimming lagoon.

16. The construction method of claim 1, wherein the controlled access area is designed so that the total beach area to swimming lagoon area ratio is 1:2.

17. The construction method of claim 1, wherein the surroundings of the swimming lagoon include the use of amphitheaters to hold events such as concerts and festivals, among others.

18. The construction method of claim 1, wherein a screen is provided in the vicinity of the swimming lagoon to broadcast content and house events and shows.

19. The construction method of claim 1, wherein the swimming lagoon is illuminated through a lighting system.

20. A construction method for creating a swimming lagoon at a retail site, the retail site having a vacant building and a parking lot within its premises, the land parcel on which the retail site premises are located has a property perimeter, and the vacant building has a foundation and is located within the vicinity of the retail site, the method comprising:
a. demolishing at least part of the retail site premises comprising the vacant building and the parking lot, wherein the demolition process includes excavating at least a 15 cm to 5 meter layer of the foundation of the vacant building and/or parking lot;
b. excavating material having a volume of at least 4,000 m3 from an area within the retail site premises comprising the vacant building and/or the parking lot;
c. forming a basin for a large water body having a surface area of at least 3,000 m2 and a minimum depth of at least 1.4 meters at its deepest point, wherein the earthworks for the basin are created within the property perimeter, and wherein the basin includes a basin perimeter and a bottom;
d. constructing water containment walls on at least one section of the basin perimeter to form a waterfront perimeter, and
e. covering the bottom of the basin with a non-permeable material, wherein the shape of the waterfront perimeter is curved and the basin has a maximum width of 300 meters.

21. The method of claim 20, further comprising:
a. constructing one section of the waterfront perimeter and basin perimeter to form a sloped access area in at least one section of the basin perimeter to form a beach access into the large water body; the beach access area including one or more barriers to cordon off the beach access area, thereby establishing a controlled access area, and wherein the controlled access area includes at least one access point to selectively allow users into the controlled access area; and
b. constructing various amenities adjacent at least a portion of the waterfront perimeter, wherein the amenities are selected from the list of: entertainment, restaurant, educational, cultural, sports, retail shopping and other commercial facilities.

* * * * *